3,069,474
ORGANIC PEROXIDES AND PROCESS FOR PREPARING THE SAME

Alfred Rieche, Berlin-Wendenschloss, Ernst Schmitz, Berlin-Altglienicke, and Christian Bischoff, Berlin-Baumschulenweg, Germany, assignors to Deutsche Akademie der Wissenschaften zu Berlin, Berlin-Adlershof, Germany
No Drawing. Filed Apr. 23, 1959, Ser. No. 808,305
Claims priority, application Germany July 23, 1958
11 Claims. (Cl. 260—610)

The invention relates to the preparation of novel organic peroxides (monoperoxy acetals).

It has been discovered that acetals derived from aldehydes of the general formula

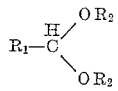

wherein $R_1$ stands for a saturated aliphatic hydrocarbon radical, aromatic hydrocarbon radical or nitro-substituted aromatic hydrocarbon radical, $R_2$ is an alkyl radical, when heated with hydroperoxides of the formula ROOH will yield organic peroxides (monoperoxyacetals) of the general formula

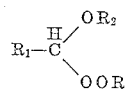

1 mole of alcohol being split off in the reaction, and wherein R is a saturated aliphatic or arylated aliphatic hydrocarbon radical. In this manner, acetals may be quite generally rearranged to new acetals with the above-mentioned alkylhydro-peroxides by gentle heating to 80° C. for several hours, the yield obtained being very satisfactory in all instances.

Up to the present it was not known that acetals could be rearranged to form different acetals by treatment at what might be called "mild" conditions. The only known reaction similar to the one described in the specification hereinabove is the exchange of an alkoxy group by an alkyl-peroxide group in the single case of a cyclic ether, viz. isochromane.

The monoperoxide acetals thus obtained are novel compounds which have not been described anywhere in the literature. They are surprisingly stable liquids of acetal-like odor and comparatively low explosiveness. The lower members of the group can be vacuum-distilled without decomposition; thus, propionic-aldehyde-ethyl-tertiary-butyl-peroxide-acetal (1-ethoxy-1-tertiary-butyl-peroxypropane) is easily obtained from propionic aldehyde diethyl acetal and tertiary butylhydroperoxide; it has a boiling point of 41–43° C. at a pressure of 24 mm. The reaction can be formulated as follows:

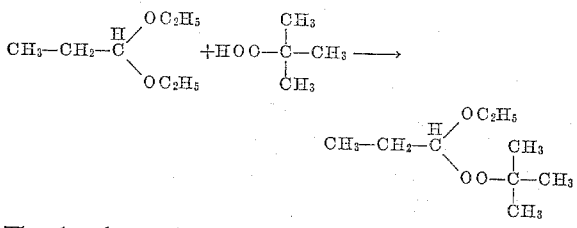

The 1 - ethoxy - 1 - tert. - butylperoxybutane made from butyric-aldehydediethyl-acetal and tert.-butylhydroperoxide has a boiling point 69–69.8° C. at 16 mm.

These compounds are stable to diluted alkali so that an excess amount of alkylhydroperoxide, which is used in a preferred operating method, may be extracted from the peroxyacetal by means of 2 N NaOH.

As aldehydes all those may be used which are capable of acetalization; as hydroperoxides, the known alkylhydroperoxides such as: methyl-, ethyl-, propyl-, tertiary butyl-, benzyl-, cyclohexene-, tetralin-, decalin-, cumyl-, hydroperoxide, and others. As may be seen from the above, the reaction can be carried out with a large number of compounds.

The novel peroxides are easily manageable catalysts for starting reactions leading to chain formations, e.g., for the polymerization of vinyl compounds.

In the following, the process of the invention will be described in a number of examples, but it should be understood that these are given by way of illustration and not of limitation and that many changes can be made in the details without departing from the spirit of the invention.

All parts are by weight.

Example 1
Preparation of:

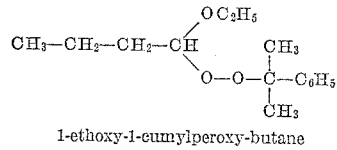

1-ethoxy-1-cumylperoxy-butane 14.6 parts butyric aldehyde diethylacetal are heated with 17.3 parts cumyl hydroperoxide to 80° C. for 7 hours. The reaction mixture is extracted by shaking 5 times with 2 N NaOH, washed with water, dried with $Na_2CO_3$ and concentrated by evaporation at a pressure of 0.02 mm. mercury column on a bath having the temperature up to 90° C. for eliminating the split off ethanol. The peroxide is obtained as a non-distillable liquid smelling slightly of acetal, which will deflagrate upon over-heating.

Yield: 17.21 pts. (70% of the theoretical yield) $n_D^{17.8}=1.4822$.

Example 2
Preparation of:

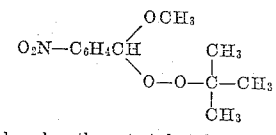

p-nitrophenyl-methoxy-tert.-butyl-peroxymethane 8.9 parts para-nitrobenzaldehyde dimethylacetal are heated with 4.5 parts tertiary butyl hydroperoxide for 10 hours to 80° C. (bath temperature). The reaction product is extracted by shaking 4 times with 2 N NaOH, washed with water, dried with $Na_2CO_3$ and concentrated by vacuum distillation (0.02 mm. mercury column) until the bath temperature is 65° C. There remains a non-distillable light yellow oily liquid which upon over-heating explodes violently.

Yield: 8.9 parts (78% of the theoretical yield) $n_D^{19.7}=1.5157$.

Example 3

Preparation of:

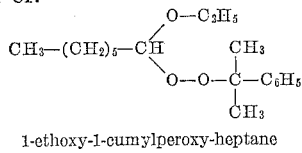

1-ethoxy-1-cumylperoxy-heptane 6.6 parts enanthaldehyde diethylacetal are heated with 5.5 parts cumyl hydroperoxide for 6.5 hours to 85° C. (bath temperature). The mass is then shaken 4 times with 2 N NaOH, washed with water, and concentrated by vacuum distillation at 0.03 mm. mercury column until the bath temperature is 80° C. The peroxide remains as clear oily liquid.

Yield: 7.3 parts (84% of the theoretical yield) $n_D^{21}=1.4816$.

Example 4

Preparation of:

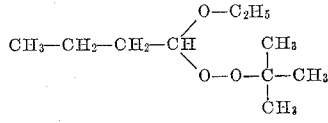

1-ethoxy-1-tert.-butylperoxy-butane 14.6 parts butyric aldehyde diethylacetal are heated with 14.0 parts of 70% tertiary butyl hydroperoxide for 6 hours in a water bath to 80° (bath temperature). After the mass has cooled down, it is shaken 4 times with 2 N NaOH, washed with water and dried with $Na_2CO_3$. Distillation is then carried out in a Vigreux column.

Yield of pure compound: 13 parts (69% of the theoretical yield). Boiling point $_{16}=69$–$69.8°$ C., $n_D^{21}=1.4082$.

Example 5

Preparation of:

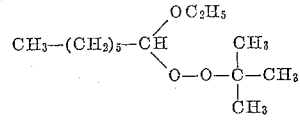

1-ethoxy-1-tert.-butylperoxy-heptane 10.9 parts enanthaldehyde diethylacetal are heated with 6.5 parts tertiary butyl hydroperoxide for 10 hours to 80° C. (bath temperature). Then the mass is shaken 4 times with 2 N NaOH, washed with water and, after addition with the same volumetric amount of ether, dried with $Na_2CO_3$ and fractionated.

Yield of pure compound: 9.2 parts (70% of the theoretical yield), boiling point $_{0.03}=45$–$46.5°$ C., $n_D^{19.7}=1.4208$.

Example 6

Preparation of:

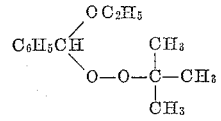

Phenyl-ethoxy-tert.-butylperoxy-methane 13.6 parts benzaldehyde diethylacetal are heated with 6.75 parts tertiary butyl hydroperoxide for 8 hours to 80° C. (bath temperature). Thereupon, the mass is shaken 4 times with 2 N NaOH, washed with water, and evaporated in vacuo to a bath temperature of 80° C. A colorless oily liquid is obtained, smelling faintly of acetal.

Yield: 12.3 parts (73% of the theoretical yield) $n_D^{21}=1.4814$.

Example 7

Preparation of:

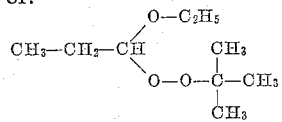

1-ethoxy-1-tert.-butylperoxy-propane 10.7 parts propionic aldehyde diethylacetal are heated with 7.3 parts tertiary butyl hydroperoxide for 7 hours to 80°–85° C. (bath temperature). The mass is shaken 3 times with 2 N NaOH, washed with water, dried with $Na_2CO_3$ and fractionated. Boiling point $_{31}=67°$ C.

Yield: 12.8 parts (89% of the theoretical yield) $n_D^{20}=1.4029$.

What is claimed is:

1. Organic peroxides of the general formula

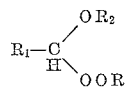

wherein $R_1$ is a member of the group consisting of n-hexyl, phenyl and p-nitrophenyl, $R_2$ is a member of the group consisting of methyl and ethyl, and R is a member of the group consisting of tert.-butyl and cumyl.

2. 1-ethoxy-1-cumylperoxy-heptane.
3. p-Nitrophenyl-methoxy-tert.-butylperoxy-methane.
4. Phenyl-ethoxy-tert.-butylperoxy-methane.
5. 1-ethoxy-1-tert.-butyl-peroxy-heptane.
6. A process for preparing organic peroxides of the general formula

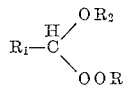

wherein $R_1$ is a radical selected from the group consisting of saturated aliphatic hydrocarbon radicals, aromatic hydrocarbon radicals and nitro-substituted aromatic hydrocarbon radicals, R is a radical selected from the group consisting of saturated aliphatic and arylated aliphatic hydrocarbon radicals, and $R_2$ is an alkyl radical, which comprises reacting an acetal of the formula

wherein $R_1$ and $R_2$ are radicals as above defined with a hydroperoxide ROOH for 6–10 hours at 60° to 80° C. and separating the alcohol formed in the reaction from the peroxide formed by subjecting the reaction mixture to distillation under reduced pressure, thereby recovering the peroxide as a separate phase.

7. A process for preparing 1-ethoxy-1-cumylperoxy-butane which comprises reacting butyric aldehyde diethyl acetal with cumylhydroperoxide for seven hours at 80° C. and removing the ethanol split off during the reaction from the mixture, whereby 1-ethoxy-1-cumylperoxybutane is recovered as the residue.

8. A process for preparing p-nitrophenyl-methoxy-tert.-butylperoxy-methane which comprises reacting p-nitrobenzaldehyde-dimethyl acetal with tert.-butylhydroperoxide for 10 hours at 80° C. and removing the methanol split off during the reaction from the mixture, whereby the p-nitrophenyl-methoxy-tert.-butylperoxy-methane is recovered as the residue.

9. A process for preparing 1-ethoxy-1-tert.-butyl-peroxy-butane which comprises reacting butyric aldehyde diethyl acetal with tert.-butylhydroperoxide for 6 hours at 80° C., separating the ethanol split off during the reaction from the mixture, and then recovering the 1-ethoxy-1-tert.-butyl-peroxy-butane by distillation.

10. A process for preparing 1-ethoxy-1-tert.-butyl-peroxy-propane which comprises reacting propionic aldehyde diethyl acetal with tert.-butylhydroperoxide for 10 hours at 80° C., separating the ethanol split off during the reaction from the mixture, and then recovering the 1-ethoxy-1-tert.-butyl-peroxy-propane by distillation.

11. A process for preparing 1-ethoxy-1-tert.-butyl-peroxy-heptane which comprises reacting enanthaldehyde diethyl acetal with tert.-butylhydroperoxide for 10 hours at 80° C., separating the ethanol split off during the reaction from the mixture, and then recovering the 1-ethoxy-1-tert.-butyl-peroxy-heptane by distillation.

References Cited in the file of this patent

UNITED STATES PATENTS 2,776,319  Ropp _____ Jan. 1, 1957

OTHER REFERENCES

Clover: Jour. Amer. Chem. Soc., vol. 44 (1922), page 1116 (1 page).

Milas et al.: Jour. Amer. Chem. Soc., vol. 76 (1954), pp. 2322-25 (4 pages).

Milas et al.: Jour. Amer. Chem. Soc., vol. 77 (1955), pp. 2536–2538 (3 pages).

(Copies of above in Patent Office Library.)